Figure 1:
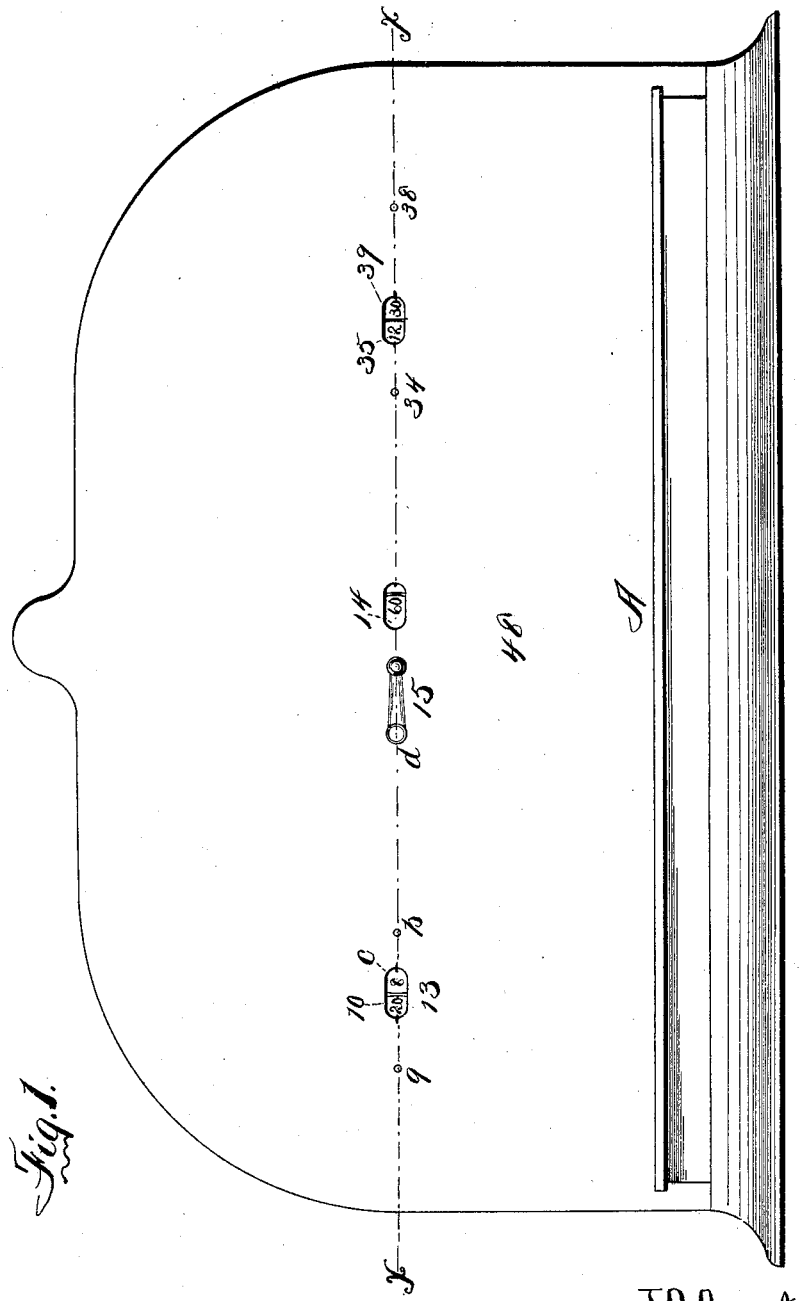

No. 606,831. Patented July 5, 1898.
J. P. ARMSTRONG.
WEIGHING MACHINE.
(Application filed Apr. 5, 1897.)
(No Model.) 5 Sheets—Sheet 1.

WITNESSES:
Charles W. Marvin
Mary A. Franklin

INVENTOR
J. P. Armstrong.
BY
Smith & Kinson
ATTORNEYS.

No. 606,831. Patented July 5, 1898.
J. P. ARMSTRONG.
WEIGHING MACHINE.
(Application filed Apr. 5, 1897.)
(No Model.) 5 Sheets—Sheet 3.

WITNESSES:
Charles N. Marvin.
Mary A. Franklin.

INVENTOR
J. P. Armstrong.
BY
Smith & Munson
ATTORNEYS.

No. 606,831. Patented July 5, 1898.
J. P. ARMSTRONG.
WEIGHING MACHINE.
(Application filed Apr. 5, 1897.)
(No Model.) 5 Sheets—Sheet 4.
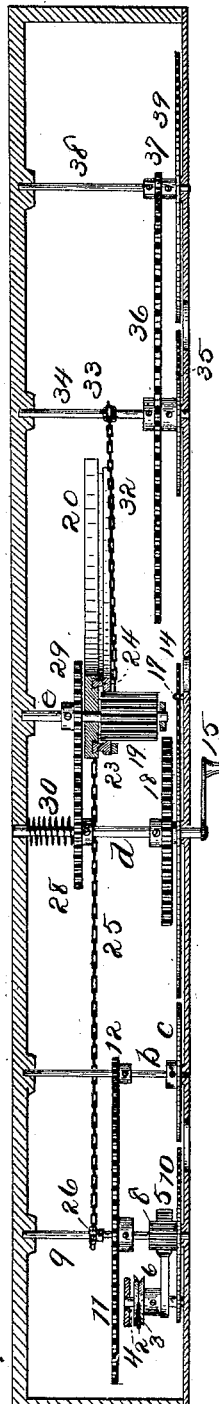
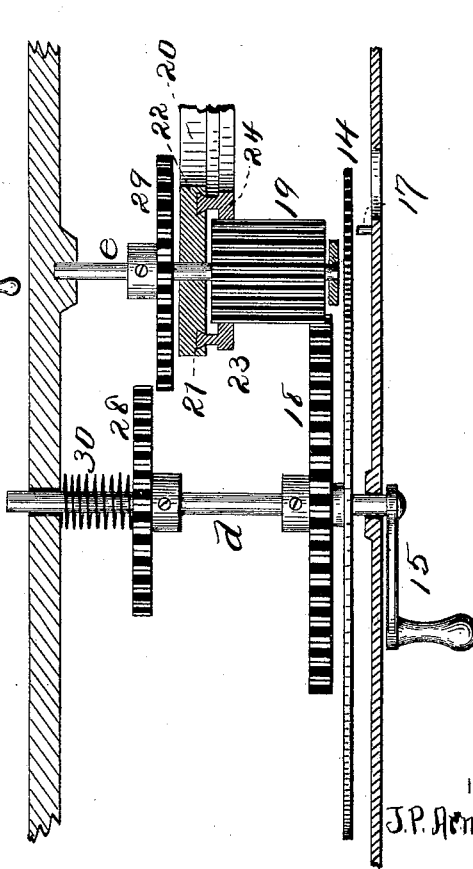
INVENTOR
J. P. Armstrong,
BY
Smith & Hinson
ATTORNEYS.
WITNESSES:
Charles M. Marvin
Mary A. Franklin

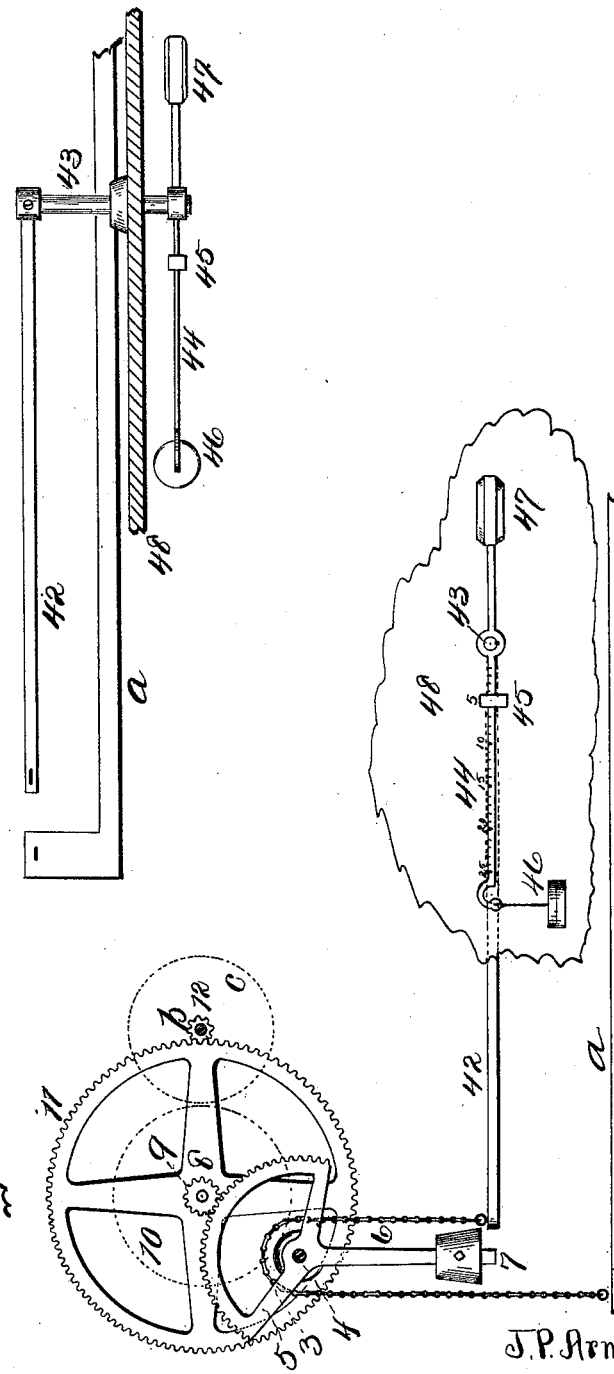

UNITED STATES PATENT OFFICE.

JAMES PORTER ARMSTRONG, OF PORT BYRON, NEW YORK.

WEIGHING-MACHINE.

SPECIFICATION forming part of Letters Patent No. 606,831, dated July 5, 1898.

Application filed April 5, 1897. Serial No. 630,698. (No model.)

*To all whom it may concern:*

Be it known that I, JAMES PORTER ARMSTRONG, of Port Byron, in the county of Cayuga, in the State of New York, have invented new and useful Improvements in Weighing-Machines, of which the following, taken in connection with the accompanying drawings, is a full, clear, and exact description.

My invention relates to scales for weighing articles or commodities.

My object is to provide a scale with a mechanism operatively connected to the scale table or platform or to a scale-beam or other suitable part of a scale, whereby a given number of pounds or pounds and ounces at a given rate are simultaneously and automatically weighed and the price at the given rate determined by the act of weighing and the force transmitted to a price mechanism.

It comprises a series of disks, wheels, or gears indicating pounds, wheels or gears indicating ounces, and suitable means to suitably connect them to the scale table, beam, or some other suitable part, which is suitably operated upon or actuated by the weight of the article or commodity, whereby they are rotated to indicate the exact weight at a specified point, as an aperture in the case, through which the weight-numerals on said wheels are visible.

It further comprises a rate wheel or disk provided with a series of numerals indicating price per pound and means to set it, manually or otherwise, so that the rate desired is visible through an opening in the casing.

It is further provided with wheels or disks which respectively indicate dollars and cents and suitable intermediate mechanism whereby the movement of the pounds-wheel is transmitted to the dollars and cents wheels, whereby they indicate the price of the number of pounds or ounces or pounds and ounces which are weighed.

It is further provided with suitable means whereby the pounds and ounces wheels are automatically returned to their normal or zero position simultaneously with the removal of the weight from the scale.

The pounds and ounces wheels are geared together or otherwise connected in a fixed ratio to each other, and the dollars and cents wheels are also geared together or otherwise connected in a fixed ratio. The setting of the rate-per-pound wheel or disk does nothing with the pounds and ounces disks, but does set the mechanism for actuating the dollars-disk and through it the cents-disk, so that the product of the rate by the weight will be mechanically indicated by said dollars and cents disks, they being rotated by intermediate connections actuated by the weight of the article or commodity weighed.

A mechanism for weighing the tare is also provided, by which a jar or other package can be weighed before being filled, the article put into it being weighed, or, knowing the tare, the weight of the contents of a package can be easily ascertained and its value at the rate agreed upon.

It is constructed as follows, reference being had to the accompanying drawings, in which—

Figure 2:
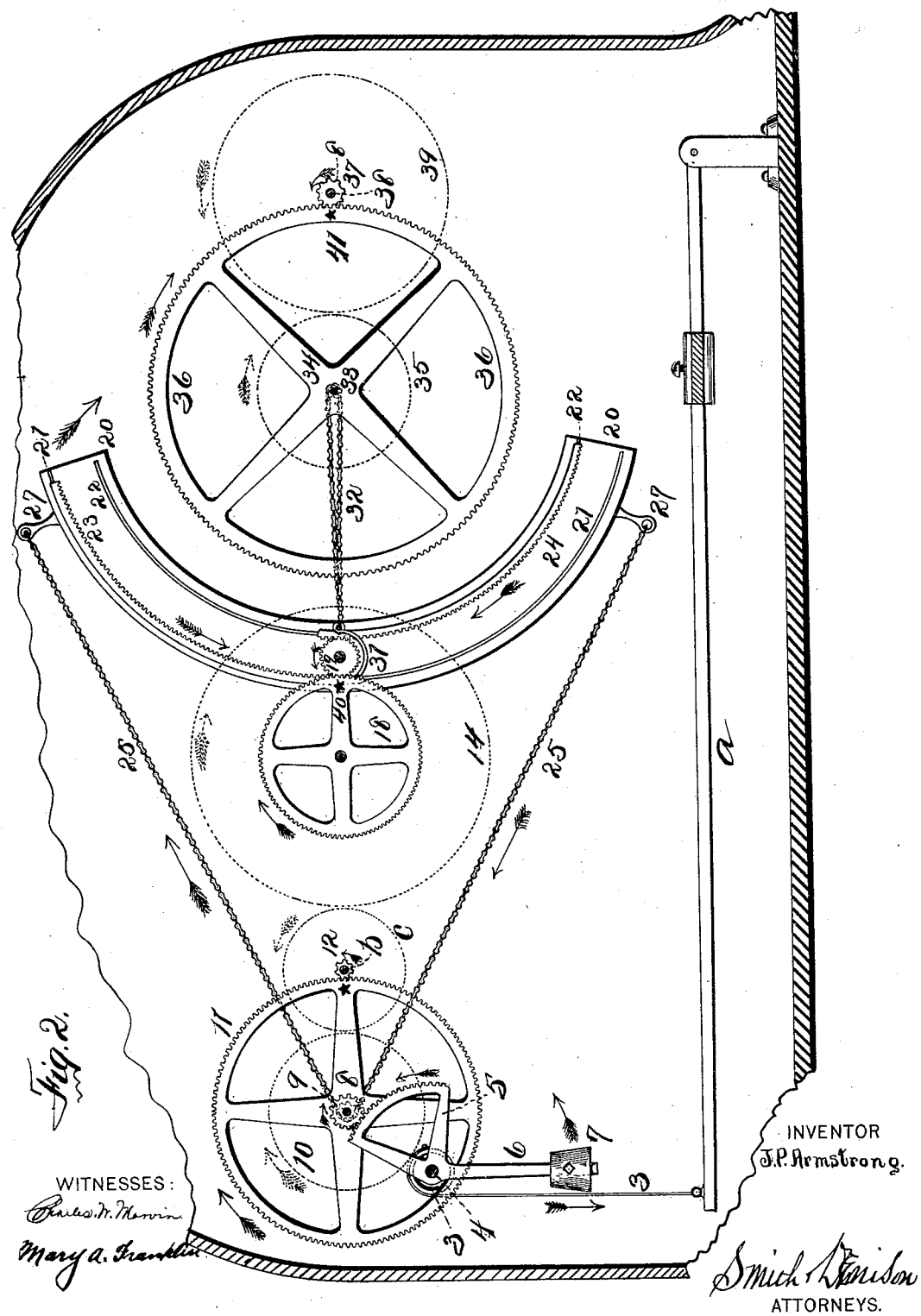
Figure 3:
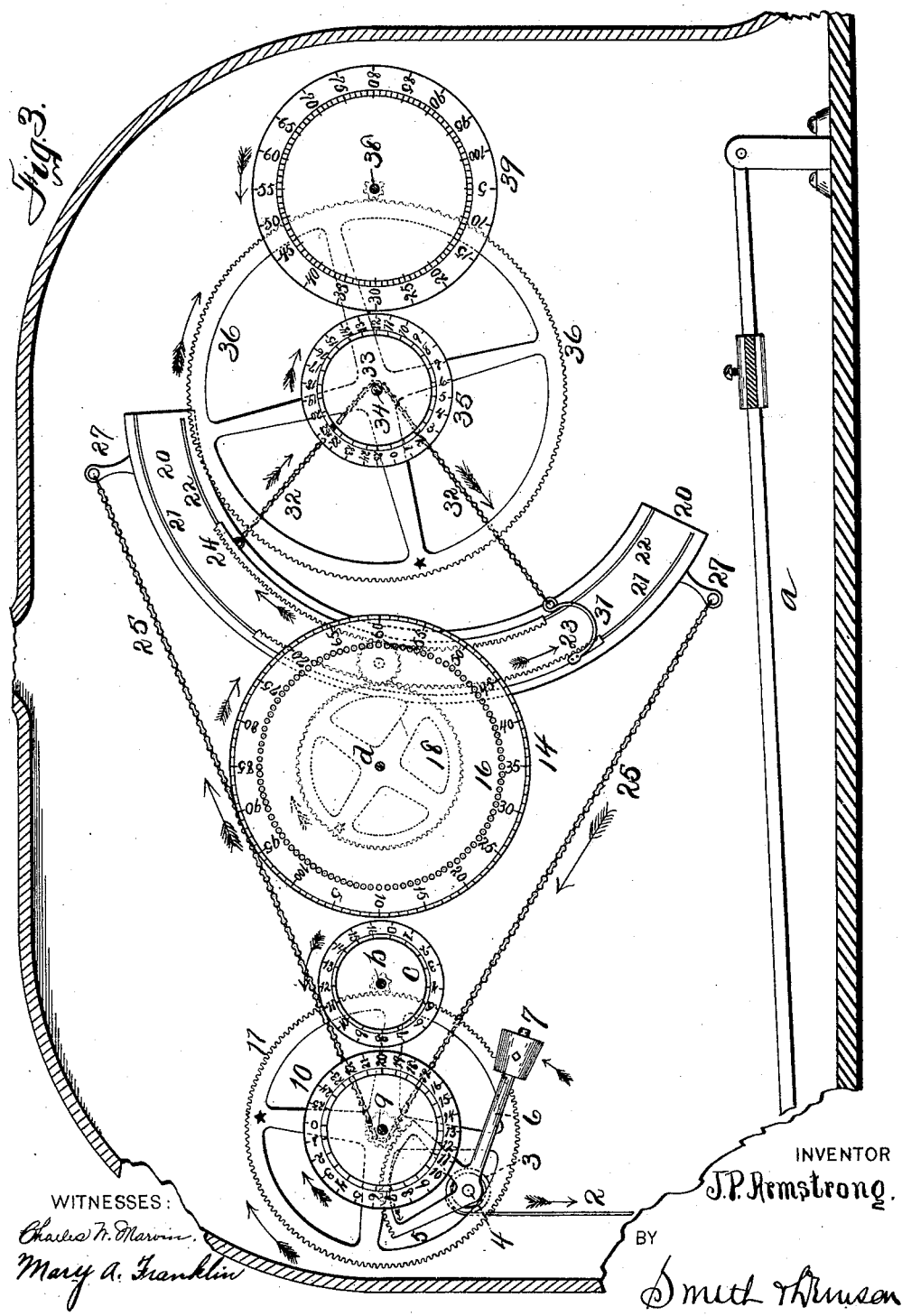

Figure 1 is a front elevation of a platform-scale supplied with my invention. Fig. 2 is a front elevation of the same with the front cut off to show the interior, some of the parts being shown in dotted lines in order not to obscure parts behind them. Fig. 3 is a like view in which the mechanisms are shown in their respective positions assumed in weighing a given weight at a given rate per pound and costing the price shown, the parts shown in Fig. 2 in dotted lines being here shown in full lines and those there shown in full lines being here shown in dotted lines. Fig. 4 is a cross-section on line $xx$ in Fig. 1, showing the rate-disk locked, as in its normal position or when set. Fig. 5 is an enlarged sectional detail showing the rate-disk unlocked, as while being set, and in engagement with the segment-setting pinion. Fig. 6 is a front elevation of the tare-weighing mechanism shown in conjunction with the pounds and ounces disks and their actuating mechanism. Fig. 7 is a detail in top plan of the tare-weighing mechanism.

A is a suitable scale, of any desired construction as to the mechanism for actuating the scale-beam $a$ by weight applied to the table, and as this mechanism can be any ordinary one suitable for the purpose and is not a part of my invention it is neither shown in the drawings nor specifically described. A cord or chain 2 connects this beam to a drum 3, secured upon rock-shaft 4, and 5 is a gear or geared segment secured to said rock-shaft and provided with an arm 6, carrying an adjustable counterbalance 7. This segment engages with a pinion 8 on a shaft 9, hereinafter called the "pound shaft," and 10 is a pound-disk secured upon said shaft and rotated by it. A gear 11 is secured upon this shaft to drive a pinion 12 on the ounce-shaft $b$ and rotate the ounce-disk $c$.

The pound-disk is shown as graduated to weigh twenty-five pounds, the ounce-wheel for sixteen ounces, and the ratio of said gear and pinion is shown as twenty-five to one, so that a single pound placed upon the scale will cause the ounce-disk to make a complete revolution and the pound-disk to indicate one pound, and the aperture 13 in the casing will show one pound and no ounces. Thus each pound upon the scale will proportionally rotate the pound-disk and will rotate the ounce-disk one full revolution, and all ounces over a pound will be indicated upon the ounce-disk and shown. Adjacent to these weight-disks a rate-per-pound disk 14 is mounted upon a suitable shaft $d$, which is provided with a suitable crank 15 for manual rotation; but power can be applied to it in many other ways. It is provided with a graduated scale of figures, here shown as extending from "1" to "100," both inclusive, and it is also provided with a series of holes 16, one for each graduation, and a pin 17 upon the inner face of the casing is adapted to engage with one of said holes to lock this rate-wheel, as hereinafter described. Upon this rate-shaft a gear 18 is mounted, engaging with a long pinion 19 whenever desired. Upon this pinion-shaft $e$ a segment 20 is pivoted in a manner suitable to permit it to rock thereon. This segment is provided with ways 21 22, concentric with its arc, in which the gear-toothed rate-adjusting segmental slides 23 24 are mounted. A chain 25 passes around a suitable gear 26, as a sprocket upon the rock-shaft $d$, having its ends suitably connected to said segment, as to arms 27 thereon, adjacent to its ends, so that the rotation of the pound-disk shaft will swing said segment upon its pivot. The rate-slides 23 24 are always in engagement with the rate-pinion 19, so that the rotation of the rate-disk when the rate-gear 18 is in engagement with said pinion will drive it and shift said rate-slides in said ways in said segment proportionally to the weight upon the scale.

The rate-shaft is adapted to slide in its bearings and is provided with a gear 28, normally engaging with a like gear 29 upon the rate-pinion shaft; but by pushing the rate-shaft in it is thrown out of such engagement, the rate-disk is released from its locking-pin, and the rate-gear is brought into engagement with said rate-pinion for setting said disk and the rate-slides. A spring 30 shifts said rate-shaft back to its normal position, locking the rate-disk upon said pin and renewing the engagement of the gears 28 and 29, said gear 28 then operating to lock the rate-pinion against rotation, which thus retains the rate-slides in their respective positions as set by the rate-disk, and thereafter when said segment is swung said slides simply rock upon said rate-pinion.

The rate-slide 23 is pivoted with an arm 31, and one end of a suitable chain 32, as a sprocket-link, is connected to said arm, passes thence around a suitable pinion 33 upon the dollars-shaft 34, and its other end is secured to the rate-slide 24, whereby the swinging of said segment will rotate this dollars-shaft, the dollars-disk 35 thereon, and the dollars-gear 36, also on said shaft. This drives the pinion 37 on the cents-shaft 38 to rotate the cents-disk 39 by the swing of said segment, upon which the slides have been previously set at the rate per pound of the article or commodity. The setting of these slides shifts the points of connection of the chain 32 apart from each other a distance regulated by the rate per pound, and the weight of the article swings the segment according to the weight, and the gear 36 and pinion 37 bearing also the ratio of twenty-five to one, the same as the pounds and ounces gear and pinion. Thus the weight is multiplied by the rate and the product is shown upon the dollars-disk through a suitable aperture in the casing.

A star 40 on the rate-gear and a star 41 on the dollars-gear severally indicate the normal positions of these gears, as shown in Fig. 2.

In Fig. 3 the pounds and ounces disk indicate that the weight upon the scale is twenty pounds and eight ounces, the rate-disks indicates that the rate is sixty cents per pound, and the dollars and cents disks indicate that the value thereof is twelve dollars and thirty cents, ($12.30.)

In Figs. 6 and 7 the tare-weighing mechanism is shown, in which the segment 5 is made longer and provided with a counterbalance 6 and 7 and in which the chain 6 is connected at one end to the scale-beam $a$, passes over a drum or pulley 3, and its other end is connected to a vibratory arm 42, carried by a shaft 43, upon which an auxiliary beam 44 is secured, and provided with a sliding weight 45 and pendent weight 46 and also having a counterbalance 47. The auxiliary beam and its weights are in front of the casing 48. When this mechanism is used and a jar is placed upon the scale, its weight will be indicated upon the pounds and ounces disks, and then by setting the weights upon the auxiliary beam 44 at the weight of said jar said pounds and ounces disks will be actuated to show zero or will be balanced, although the jar still remains upon the scale. If any article or commodity be then placed in said jar, its weight will be shown on said pounds and ounces disks.

In case it is desired to know the weight and value of a filled package, as a jar of butter, the weight of the jar and the price per pound being known, the weights upon the beam 44 are adjusted to equal that of the jar, and when the package is placed upon the scale the weight of the contents will be shown upon the pounds and ounces disks, and the rate-disk having been duly set at the rate the dollars and cents disks will duly show the value of said contents.

It will be seen that the shifting of the geared racks or slides 23 and 24 according to the rate, and the spreading apart of the ends of the chain 32 have no effect upon the dollars-wheel; that the swing upon its pivot of the segment 20 after the rate is set throws the upper end down toward the chain and the lower end away from it, which creates a draw upon it and rotates the pounds and ounces disks, according to the weight upon the scale, through the strain upon the chain 25.

The rate wheel and slides must be reset with each change of the rate; but the function of the weight 7 is to return all of the other members to their normal positions as soon as the weight is removed from the scale.

Having described my invention, what I claim, and desire to secure by Letters Patent, is—

1. In a weighing-machine, a casing in combination with a rotatable rate-disk, its shaft adapted to slide in its bearings, and a lock-pin adapted to engage with said disk at any predetermined point indicative of any desired rate.

2. In a weighing-machine, a casing, a shaft mounted therein and adapted to be reciprocated longitudinally, combined with a rate-disk upon said shaft, a lock-pin upon said casing engaging with said disk to lock it at any rate-indicating point, and a spring holding said disk in its locked position.

3. In a weighing-machine, the combination with rotating weight-indicating disks, and rotating value-showing disks, of a swinging segment connected to and actuated by said weight-disks, and actuating said value-disks through its connection thereto.

4. In a weighing-machine, the combination with a rate-disk of a segment, and slides mounted thereon adapted to be shifted according to the rotation of said disk and the rate indicated by it at any point in its revolution.

5. In a weighing-machine, the combination with a rotatable rate-indicating disk, of a segment and slides mounted therein adapted to be shifted in opposite directions by the rotation of said disk and the rate indicated at any point in its revolution.

6. In a weighing-machine, the combination with rotatable weight-indicating disks, and a rotatable rate-indicating disk, of a swinging segment connected to and actuated by said weight-disks, and slides in said segment adapted to be shifted therein by the rotation of said rate-disk isochronous with the rate at which it is set.

7. In a weighing-machine, the combination with rotatable weight-indicating disks, and a rotatable rate-indicating disk, of a swinging segment connected to and actuated by said weight-disks, and rate-slides in said segment adapted to be shifted in opposite directions by the rotation of said disk isochronous with said rate-disk, and means to lock them and said rate-disk at any predetermined point.

8. In a weighing-machine, the combination with a rate-indicating disk, rate-slides isochronous therewith at all times, and a swinging segment carrying said slides, of value-indicating disks connected to said slides and rotatable by the swing of said segment, and means to swing it.

9. In a weighing-machine, the combination with a rate-indicating disk, rate-slides always isochronous therewith, and a swinging segment carrying said slides, of value-indicating disks connected to said slides and rotatable by the swing of said segment in varying degree according to the positions assumed by said slides, and means to swing said segment.

10. In a weighing-machine, the combination with rotatable value-indicating disks, of a swinging bar, a belt connecting it thereto, and means to shift the location of the points of connection of said belt to said segment, whereby said disks are variably rotated according to the shift of said belt.

11. A weighing-machine comprising the following instrumentalities combined with a scale, viz: rotatable weight-indicating disks, a rotatable rate-indicating disk, value-indicating disks operatively connected to said weight-indicating disks, and rotatable in varying degree according to the weight upon the scale, in conjunction with said rate-indicating disk whereby said value-indicating disks indicate the product of the weight by the rate.

12. In a weighing-machine, the combination with rotatable disks indicating pounds and ounces, and a vibratory scale-beam connected to one of said disks to drive it to rotate the other, of an auxiliary scale-beam and weights, connected to said disks to rotate them according to its deflection whereby the tare of a package is determined and said disks restored to their normal zero-points by the adjusting of the weights upon said auxiliary beam.

In witness whereof I have hereunto set my hand this 20th day of March, 1897.

JAMES PORTER ARMSTRONG.

In presence of—
JOHN B. SHADDUCK,
CHARLES R. BERRY.